United States Patent
Yin et al.

(10) Patent No.: US 10,454,575 B2
(45) Date of Patent: Oct. 22, 2019

(54) FIBER RECOGNITION METHOD, OPTICAL LINE TERMINAL, AND RECOGNITION SYSTEM

(71) Applicant: HUAWEI TECHNOLOGIES CO., LTD., Shenzhen (CN)

(72) Inventors: Jinrong Yin, Shenzhen (CN); Sulin Yang, Shenzhen (CN); Shu Li, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 392 days.

(21) Appl. No.: 14/270,751

(22) Filed: May 6, 2014

(65) Prior Publication Data
US 2015/0288446 A1    Oct. 8, 2015

Related U.S. Application Data

(63) Continuation of application No. PCT/CN2011/081937, filed on Nov. 8, 2011.

(51) Int. Cl.
*H04B 10/077* (2013.01)
*G02B 6/38* (2006.01)
(Continued)

(52) U.S. Cl.
CPC ....... *H04B 10/0775* (2013.01); *G02B 6/3895* (2013.01); *G02B 6/4452* (2013.01);
(Continued)

(58) Field of Classification Search
CPC . H04B 10/0775; G02B 6/3895; G02B 6/4452
(Continued)

(56) References Cited

U.S. PATENT DOCUMENTS 6,290,287 B1 * 9/2001 Guyomard ........... B60Q 1/0441
                                                    296/193.09
6,920,287 B1 * 7/2005 Hinds ................ H04B 10/0771
                                                    370/241
(Continued)

FOREIGN PATENT DOCUMENTS

CN    2643333    9/2004
CN    1863104    11/2006
(Continued)

OTHER PUBLICATIONS

Extended and Supplementary European Search Report dated Sep. 26, 2014 in corresponding European Patent Application No. 11867150.2.
(Continued)

*Primary Examiner* — Amritbir K Sandhu
(74) *Attorney, Agent, or Firm* — Womble Bond Dickinson (US) LLP

(57) ABSTRACT

Embodiments of the present invention disclose a fiber recognition method, an optical line terminal, and a system. The method includes: obtaining, by an optical line terminal, identification information of a fiber connected to an optical line terminal and to be recognized; generating, by the optical line terminal, a data frame that includes the identification information of the fiber to be recognized; transmitting, by the optical line terminal, optical signals that are generated according to the data frame to the fiber to be recognized, so as to make a fiber recognition instrument implement identification for the fiber to be recognized. The present invention can implement fiber recognition easily and conveniently. When a new ONU user is added to a distributed network, service interruption can also be avoided for a user who is normally using a service, and the cost is low.

14 Claims, 6 Drawing Sheets

(51) Int. Cl.
G02B 6/44 (2006.01)
H04J 14/02 (2006.01)
H04Q 11/00 (2006.01)

(52) U.S. Cl.
CPC ...... *H04J 14/0272* (2013.01); *H04Q 11/0067* (2013.01); *H04Q 2011/0079* (2013.01)

(58) Field of Classification Search
USPC .................................................. 398/25–28
See application file for complete search history.

(56) References Cited

U.S. PATENT DOCUMENTS

| | | | | |
|---|---|---|---|---|
| 8,384,522 | B2* | 2/2013 | Macauley | G01S 5/14 340/10.1 |
| 8,731,405 | B2* | 5/2014 | Renfro, Jr. | G02B 6/3878 398/117 |
| 8,917,987 | B2* | 12/2014 | Wen | H04B 10/071 398/16 |
| 9,106,335 | B2* | 8/2015 | Mun | H04B 10/07957 |
| 9,112,611 | B2* | 8/2015 | Palanisamy | H04B 10/25754 |
| 9,461,737 | B2* | 10/2016 | Wu | H04B 10/077 |
| 9,467,335 | B2* | 10/2016 | Weng | H04L 41/0806 |
| 9,509,370 | B2* | 11/2016 | Takeyama | H04B 3/46 |
| 9,641,277 | B2* | 5/2017 | Cao | H04J 14/02 |
| 9,774,390 | B2* | 9/2017 | Zhou | H04B 10/071 |
| 10,225,628 | B2* | 3/2019 | Raza | H04Q 1/148 |
| 2002/0054409 | A1* | 5/2002 | Bartur | H04B 10/40 398/139 |
| 2003/0099243 | A1* | 5/2003 | Oh | H04Q 11/0066 370/395.21 |
| 2004/0136712 | A1* | 7/2004 | Stiscia | H04J 3/1694 398/60 |
| 2004/0208553 | A1 | 10/2004 | Yang et al. | |
| 2005/0002390 | A1* | 1/2005 | Kim | H04L 49/45 370/389 |
| 2005/0078957 | A1* | 4/2005 | Hendow | G01J 3/36 398/33 |
| 2006/0221865 | A1* | 10/2006 | Hawbaker | H04L 41/0213 370/255 |
| 2006/0277324 | A1* | 12/2006 | Aldereguia | G06F 13/4072 710/1 |
| 2007/0168841 | A1* | 7/2007 | Lakkis | H03M 13/1505 714/781 |
| 2007/0292132 | A1* | 12/2007 | Zhao | H04B 10/00 398/63 |
| 2008/0159738 | A1 | 7/2008 | Lavranchuk | |
| 2008/0218355 | A1* | 9/2008 | Downie | G02B 6/42 340/572.7 |
| 2009/0047013 | A1 | 2/2009 | Effenberger | |
| 2009/0092388 | A1* | 4/2009 | Yang | H04B 10/071 398/13 |
| 2009/0148157 | A1* | 6/2009 | Bernard | H04J 3/1694 398/25 |
| 2009/0208204 | A1* | 8/2009 | Zhang | H04L 12/2861 398/25 |
| 2009/0208227 | A1* | 8/2009 | Yoshida | H04B 10/27 398/202 |
| 2009/0232499 | A1* | 9/2009 | Sarashina | H04J 3/1694 398/63 |
| 2009/0263123 | A1* | 10/2009 | Zhu | H04B 10/071 398/16 |
| 2010/0239257 | A1* | 9/2010 | Grossman | H04J 14/0282 398/68 |
| 2011/0066014 | A1* | 3/2011 | Bechtel | A61B 5/0059 600/323 |
| 2011/0215870 | A1* | 9/2011 | Lao | H03F 3/45475 330/260 |
| 2012/0045205 | A1* | 2/2012 | Perron | H04B 10/0795 398/48 |
| 2013/0028594 | A1* | 1/2013 | Li | H04B 10/07 398/25 |
| 2013/0051794 | A1* | 2/2013 | Han | H04B 10/07 398/25 |
| 2013/0188966 | A1* | 7/2013 | Wu | H04B 10/27 398/139 |
| 2014/0161456 | A1* | 6/2014 | Sugawa | H04J 14/0227 398/72 |
| 2014/0341564 | A1* | 11/2014 | Westlund | H04B 10/614 398/16 |
| 2015/0104177 | A1* | 4/2015 | Kato | H04B 10/40 398/79 |
| 2015/0227403 | A1* | 8/2015 | Zhang | G06F 11/1008 714/704 |
| 2015/0288446 | A1* | 10/2015 | Yin | G02B 6/3895 398/28 |

FOREIGN PATENT DOCUMENTS

| | | |
|---|---|---|
| CN | 101150363 | 3/2008 |
| CN | 101754055 | 6/2010 |
| CN | 101902277 | 12/2010 |
| CN | 102123331 | 7/2011 |
| JP | 2005-303809 | 10/2005 |
| JP | 2009-212778 | 9/2009 |
| WO | 0211320 A2 | 2/2002 |

OTHER PUBLICATIONS

International Search Report dated Aug. 16, 2012 in corresponding International Patent Application No. PCT/CN2012/081937.
International Search Report dated Nov. 8, 2011 in corresponding International Patent Application No. PCT/CN2011/081937.
Extended European Search Report for European Application No. 16201020.1 dated Aug. 9, 2017.

* cited by examiner

| Frame header part | Operator information | Protocol type | Transmit optical power | Power budget level | ... | ONU transmitting wavelength information |

FIBER RECOGNITION METHOD, OPTICAL LINE TERMINAL, AND RECOGNITION SYSTEM

CROSS-REFERENCE TO RELATED APPLICATIONS

This application is a continuation of International Application No. PCT/CN2011/081937, filed on Nov. 8, 2011, which is hereby incorporated by reference in its entirety.

TECHNICAL FIELD

Embodiments of the present invention relate to the field of fiber recognition, and in particular, to a fiber recognition method, an optical line terminal, and a recognition system.

BACKGROUND

With increasing growth of user demand for bandwidths, "fiber taking the place of copper" is an irreversible trend of an access network. Due to advantages of technologies and costs and other factors, fiber access networks are developing rapidly in recent years. Fiber access networks include point-to-point (P2P) optical access networks and passive optical networks (PON). A P2P optical access network is a point-to-point technology, and is formed by an optical line terminal (OLT) at a central office end, an optical network unit (ONU) or an optical network terminal (ONT) at a user side, and a fiber. An optical line terminal is connected to an optical network unit or optical network terminal. A PON technology refers to a point-to-multipoint (P2MP) fiber access technology, and is formed by an OLT at the central office end, an ONU or ONT at the user side, an optical network terminal, and an optical distribution network (ODN). An optical line terminal is connected to one or more optical network units or optical network terminals.

In stages of optical network construction, service distribution, and relevant maintenance, it is necessary to recognize fibers and determine mapping relationships between many optical cables and fibers by effective means, so as to connect and track a corresponding fiber link quickly.

Currently, a fiber recognition system includes a light source device and a fiber recognition instrument. The light source device can transmit a specific signal such as a direct current optical signal, and the fiber recognition instrument provides a fiber slot for bending the fiber, detects a light leakage signal generated by the fiber bend, and determines a received signal frequency. A specific usage process is: An operator at the central office end connects the light source device to a fiber to be recognized, and transmits a specific signal to the fiber for transmission, and at the same time, notifies the transmitted signal to a remote detection staffer. The remote detection staffer connects many fibers the fiber recognition instrument one by one to detect whether any signal is transmitted by the light source device. If the transmitted signal is detected, it indicates that the two persons are operating a same fiber, and therefore, the fiber is recognized.

The prior art has the following defects:

In the detection process, one operator needs to connect the light source device at the central office end to the fiber to be recognized, and at the same time, another operator at a remote end needs to connect the fiber recognition instrument to each fiber to be detected and make a judgment according to optical signals on this fiber. Through collaboration between the two persons, the fiber is tracked and located.

Once a fiber is identified, the persons at both ends need to switch simultaneously to continue to identify other fibers. However, the length of a physical link of an optical network is up to 20 km, which brings certain difficulties for collaboration between the two operators. Misjudgment tends to occur, and the labor cost is huge.

When a new ONU user is added to a distributed network and it is necessary to check whether the fiber of the ONU is connected to a correct OLT port, the operator at the central office end needs to unplug the fiber connected to the corresponding OLT port and connect it to the light source device, which tends to get an existing user offline and cause service interruption.

The light source device in the system is independent of the OLT device, and generally only transmits specific signals such as direct current optical signals, and cannot carry information about the OLT port connected to the fiber, and therefore, the information about the OLT port connected to the fiber link cannot be known. In addition, the independent light source device also increases costs.

SUMMARY

A technical issue to be solved by embodiments of the present invention is how to quickly and effectively identify a fiber to be recognized.

To solve the above technical issue, an embodiment of the present invention provides a fiber recognition method, including:

obtaining identification information of a fiber connected to an optical line terminal and to be recognized, where the identification information of the fiber to be recognized includes any one of or any combination of the following: port information of the optical line terminal connected to the fiber to be recognized, service provider information, a protocol type of an optical line terminal port, transmit optical power of the optical line terminal port, a power budget level of the optical line terminal port, whether the optical line terminal port is an active port or a standby port, whether the optical line terminal port is connected to a remote radio unit, transmit optical power of the remote radio unit if the optical line terminal port is connected to the remote radio unit, a line coding scheme used by the optical line terminal port, and optical node transmitting wavelength information received by the optical line terminal;

generating a data frame that includes the identification information of the fiber to be recognized; and transmitting optical signals that are generated according to the data frame to the fiber to be recognized, so as to make a fiber recognition instrument implement identification for the fiber to be recognized.

Correspondingly, an embodiment of the present invention further provides an optical line terminal, including:

an obtaining module, configured to obtain identification information of a fiber connected to an optical line terminal and to be recognized, where the identification information of the fiber to be recognized includes any one of or any combination of the following: port information of the optical line terminal connected to the fiber to be recognized, service provider information, a protocol type of an optical line terminal port, transmit optical power of the optical line terminal port, a power budget level of the optical line terminal port, whether the optical line terminal port is an active port or a standby port, whether the optical line terminal port is connected to a remote radio unit, transmit optical power of the remote radio unit if the optical line terminal port is connected to the remote radio unit, a line coding scheme used by the optical line terminal port, and optical node transmitting wavelength information received by the optical line terminal;

a signal generating module, configured to generate a data frame that includes the identification information of the fiber to be recognized, where the identification information is obtained by the obtaining module; and a signal transmitting module, configured to transmit optical signals that are generated according to the data frame to the fiber to be recognized, so as to make a fiber recognition instrument implement identification for the fiber to be recognized, where the data frame is generated by the signal generating module.

Correspondingly, an embodiment of the present invention further provides a fiber recognition instrument, including:

a signal receiving module, configured to receive optical signals; and a signal processing module, configured to analyze and process the optical signals received by the signal receiving module, recover identification information carried in the optical signals, and, according to the recovered identification information, implement identification for a fiber to be recognized.

Correspondingly, an embodiment of the present invention further provides a fiber recognition system, including: an optical line terminal and a fiber recognition instrument, where: a fiber to be recognized is connected to the optical line terminal, and the optical line terminal is configured to obtain identification information of the fiber to be recognized, and generate a data frame that includes the obtained identification information of the fiber to be recognized, and transmit optical signals that are generated according to the data frame to the fiber to be recognized, where the identification information of the fiber to be recognized includes any one of or any combination of the following: port information of the optical line terminal connected to the fiber to be recognized, service provider information, a protocol type of an optical line terminal port, transmit optical power of the optical line terminal port, a power budget level of the optical line terminal port, whether the optical line terminal port is an active port or a standby port, whether the optical line terminal port is connected to a remote radio unit, transmit optical power of the remote radio unit if the optical line terminal port is connected to the remote radio unit, a line coding scheme used by the optical line terminal port, and optical node transmitting wavelength information received by the optical line terminal; and the fiber recognition instrument is configured to: according to the received optical signals, implement identification for the fiber to be recognized.

Correspondingly, the present invention further provides another fiber recognition method, including:

obtaining identification information of a fiber connected to an optical line terminal and to be recognized;

generating a data frame that includes the identification information of the fiber to be recognized; and transmitting optical signals that are generated according to the data frame to the fiber to be recognized, where, the identification information of the fiber to be recognized, which is carried in the data frame, is used to instruct a fiber recognition apparatus to recognize a fiber that transmits the optical signals.

By implementing the embodiments of the present invention, the following beneficial effects are described as follows:

The present invention can implement fiber recognition easily and conveniently with only one detection operator, which reduces labor costs. In addition, when a new ONU user is added to a distributed network, service interruption can be avoided for a user who is normally using a service. The fiber recognition system in the present invention does not need to be independent of a light source device of an OLT device, which further saves costs.

BRIEF DESCRIPTION OF DRAWINGS

To describe the technical solutions in the embodiments of the present invention more clearly, the following briefly introduces the accompanying drawings required for describing the embodiment. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
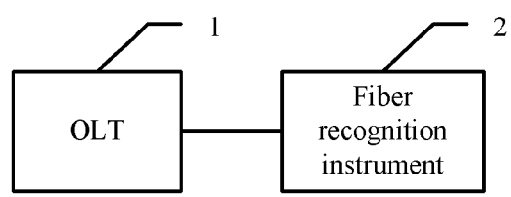
FIG. 1 is a structural diagram of a fiber recognition system according to an embodiment of the present invention.

Refer to FIG. 1, which is a schematic structural diagram of a fiber recognition system according to an embodiment of the present invention. The system includes an OLT 1 and a fiber recognition instrument 2, where a fiber to be recognized is connected to a port of the OLT 1.

The OLT 1 in this embodiment can not only transmit an optical signal that carries data according to the prior art, but also obtain identification information of the fiber to be recognized, generate a data frame that includes the obtained identification information of the fiber to be recognized, and transmit optical signals that are generated according to the data frame to the fiber to be recognized, where the identification information of the fiber to be recognized includes any one of or any combination of the following: port information of the optical line terminal connected to the fiber to be recognized, service provider information, a protocol type of an optical line terminal port, transmit optical power of the optical line terminal port, a power budget level of the optical line terminal port, whether the optical line terminal port is an active port or a standby port, whether the optical line terminal port is connected to a remote radio unit, transmit optical power of the remote radio unit if the optical line terminal port is connected to the remote radio unit, a line coding scheme used by the optical line terminal port, and optical node transmitting wavelength information received by the optical line terminal.

The fiber recognition instrument 2 is configured to: according to the received optical signals, implement identification for the fiber to be recognized.

In the process of optical network construction, service distribution, and relevant maintenance, as controlled by an element management system (EMS) or a network management system (NMS) or an OLT 1 local command control terminal, or as initiated periodically, the OLT 1 can collect and obtain identification information of each fiber to be recognized, encode the identification information of each fiber to be recognized, convert the identification information into an optical signal, and transmit the optical signal to the fiber to be recognized that is connected to a corresponding port of OLT 1. A detection operator at a remote end receives an optical signal on each fiber at the remote end (such as a user side) by using the fiber recognition instrument 2, and judges whether information carried in the optical signal of each fiber is the identification information of the fiber to be recognized, thereby identifying one of multiple remote fibers as the fiber to be recognized, and facilitating subsequent work such as detection and evaluation of link quality and connection quality for the fiber.

According to obtained coding scheme information, the OLT 1 generates the data frame that includes the identification information of the fiber to be recognized, where the coding scheme information includes any one of the following: PN sequence combination coding scheme information, Golay complementary sequence combination coding scheme information, and sine signal combination coding scheme information.

According to obtained transmitting indication information, the OLT 1 transmits the optical signals that are generated according to the data frame to the fiber to be recognized, where the transmitting indication information includes singly transmitting any one of the following: indication information, periodical burst transmitting indication information, and periodical continuous transmitting indication information.

The coding scheme information and the transmitting indication information may be obtained in the manner of obtaining user configuration information. The OLT 1 may include a user interface that is used to obtain coding scheme information and transmitting indication information that are configured by a user.

The fiber recognition instrument 2 recognizes multiple fibers to be detected, and determines the fiber to be recognized among them. Specifically, the fiber recognition instrument 2 is configured to receive an optical signal on the fiber to be detected, analyze and process an original sequence corresponding to the received optical signal, determine a start position of the original sequence, and recover identification information carried in the original sequence whose start position is determined. The fiber recognition instrument 2 may only output and display the recovered information directly, and, according to the displayed information, a detection operator determines whether a fiber that transmits the information is the fiber to be recognized. The fiber recognition instrument may also automatically judge whether the recovered information is the same as the identification information of the fiber to be recognized, and, if yes, determine that the fiber that transmits the information is the fiber to be recognized. The fiber recognition instrument may send prompt information such as voices and texts if the recovered information is the same as the identification information of the fiber to be recognized.

In addition, to ensure judgment accuracy, the OLT 1 may transmit, by using a periodical burst transmitting mode or a periodical continuous transmitting mode, the optical signals that are generated according to the data frame, to the fiber to be recognized; and the fiber recognition instrument 2 continuously receives the optical signal on each fiber to be detected, recovers multiple data frames, performs an averaging operation for the multiple data frames to obtain relatively accurate information on each fiber to be detected respectively, compares the information with preset identification information of the fiber to be recognized, and identifies the fiber to be recognized among multiple fibers to be detected.

In addition, as required, the fiber recognition instrument 2 may further measure energy of the optical signal transmitted on the fiber to be recognized.

In the fiber recognition system, after recognition and detection are started, it is not necessary to unplug the fiber that is already connected to the OLT 1, and only one detection operator at the remote end is required to recognize and judge multiple fibers by using the fiber recognition instrument 2, and, according to the optical signals, identify a fiber to be recognized, and can directly obtain other information such as information of an OLT port connected to the fiber.

Figure 2:
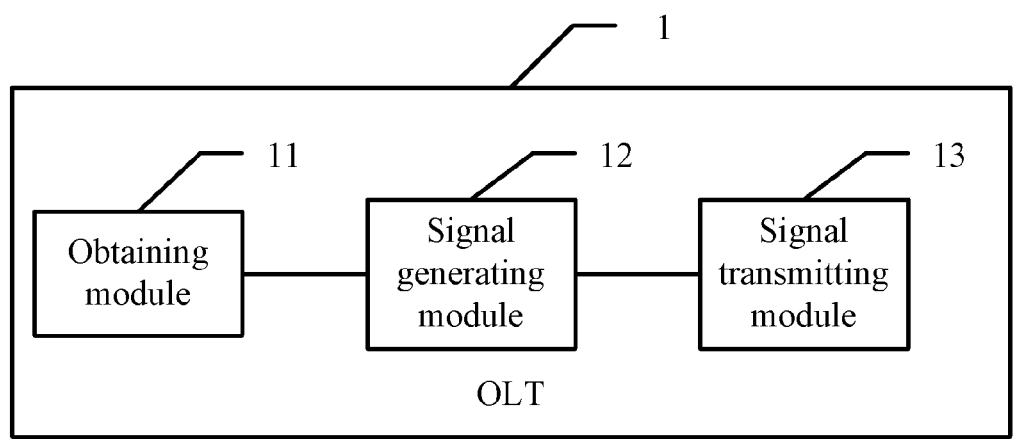
FIG. 2 is a schematic structural diagram of an optical line terminal in FIG. 1.

Specifically, refer to FIG. 2, which is a schematic structural diagram of an optical line terminal in FIG. 1. The OLT 1 includes an obtaining module 11, a signal generating module 12, and a signal transmitting module 13.

The obtaining module 11 is configured to obtain identification information of a fiber connected to the OLT 1 and to be recognized.

The signal generating module 12 is configured to generate a data frame that includes the identification information of the fiber to be recognized, where the identification information is obtained by the obtaining module 11.

The signal transmitting module 13 is configured to transmit optical signals that are generated according to the data frame to the fiber to be recognized, so as to make a fiber recognition instrument 2 implement identification for the fiber to be recognized, where the data frame is generated by the signal generating module 12.

The identification information obtained by the obtaining module 11 may specifically be OLT port information of the OLT 1, and the OLT port information may include information such as a frame number, a slot number, and a port number of the OLT port of the OLT 1 connected to the fiber.

Further, the obtaining module 11 may be configured to obtain coding scheme information, where the coding scheme information is used to indicate a coding scheme of the data frame that includes the identification information of the fiber to be recognized, and the coding scheme information includes any one of the following: PN sequence combination coding scheme information, Golay complementary sequence combination coding scheme information, and sine signal combination coding scheme information, which makes it convenient for the signal generating module 12 to encode, by using any one of the PN sequence combination coding scheme information, the Golay complementary sequence combination coding scheme information, and the sine signal combination coding scheme information, the identification information of the fiber to be recognized, and generate the data frame that includes the identification information of the fiber to be recognized.

The obtaining module 11 may be further configured to obtain transmitting indication information, where the transmitting indication information is used to indicate a transmitting mode of transmitting the optical signals that are generated according to the data frame, where the transmitting indication information includes singly transmitting any one of the following: indication information, periodical burst transmitting indication information, and periodical continuous transmitting indication information, which makes it convenient for the signal transmitting module 13 to transmit, by using the transmitting mode indicated by the transmitting indication information, the optical signals that are generated according to the data frame, to the fiber to be recognized.

The obtaining module 11 may, as controlled by an EMS or an NMS or an OLT 1 local command control terminal or as initiated periodically, obtain the identification information of the fiber to be recognized that is connected to the OLT 1, the coding scheme information, and the transmitting indication information.

Figure 4:
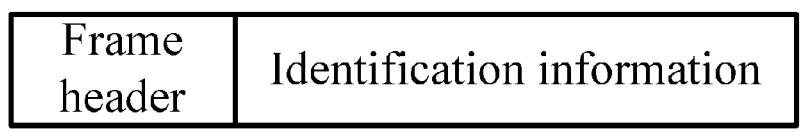
FIG. 4 is a schematic diagram of one of specific data frame formats according to an embodiment of the present invention.

To make it convenient for the fiber recognition instrument 2 to recognize a start position of the data frame, the signal generating module 12 performs frame delimitation for the data frame. The generated data frame includes a frame header part and a content part that carries the identification information that includes information such as OLT port information. A specific data frame may be shown in FIG. 4.

Figure 5:
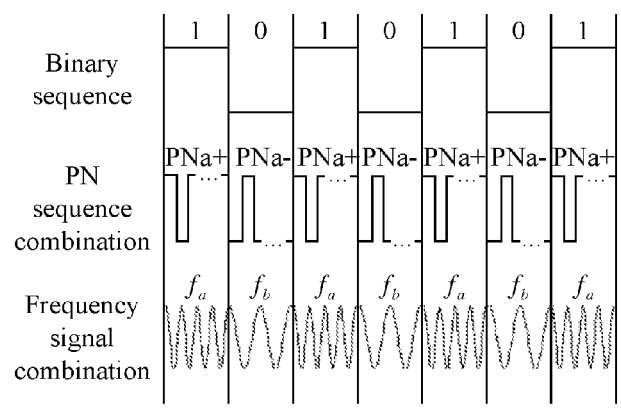
FIG. 5 is a schematic diagram of PN sequence combination coding and sine signal combination coding for binary sequences.

Specifically, optionally, to make the fiber recognition instrument 2 increase a signal-to-noise ratio of received signals, the signal generating module 12 may convert the identification information that includes the information such as the OLT port information into a binary sequence, then, perform combination coding for the binary sequence by using pseudo-noise sequences (PN sequence) or sine signals, and generate the data frame that carries the identification information that includes the information such as the OLT port information. FIG. 5 is a schematic diagram of PN sequence combination coding and sine signal combination coding for binary sequences. In the PN sequence combination coding in FIG. 5, a bit 1 is mapped to a positive sequence of a specific PN sequence, such as PNa+, and a bit 0 is mapped to a negative sequence of a specific PN sequence, such as PNa−. In a sine signal, however, the bit 1 is mapped to a sine wave of a specific frequency such as fa, and the bit 0 is mapped to a sine wave of a specific frequency such as fb.

Figure 6:
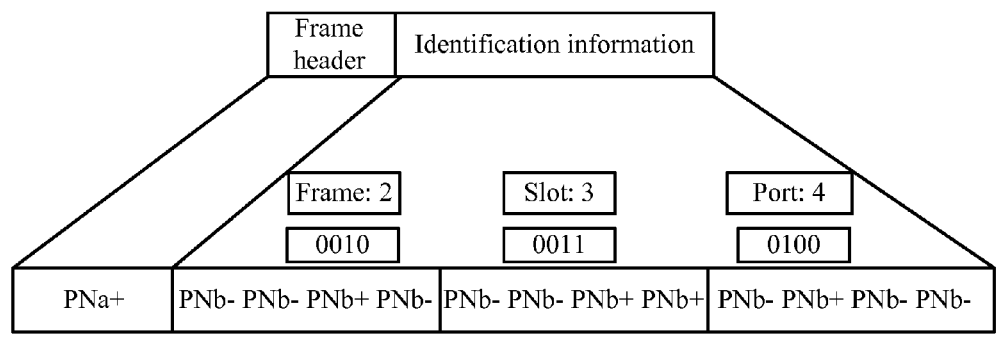
FIG. 6 is a schematic diagram of one of data frames obtained from PN sequence combination coding according to an embodiment of the present invention.

A specific data frame format that uses the PN sequence combination coding is described in the following:

A first type of data frame format that carries the identification information that includes the information such as the OLT port information is described in the following:

The frame header part may be denoted by a specific PN sequence such as PNa+. For the content part that carries the identification information that includes the information such as the OLT port information, assuming that the identification information of the fiber to be recognized is denoted by the frame number, the slot number, and the port number corresponding to the OLT port, the numbers may be converted into binary numerals formed by a certain number of bits first. If a value range of the frame number, the slot number, and the port number is 0-15, the numbers may be denoted by a 4-bit binary numeral respectively; and, if the value range of the frame number, the slot number, and the port number is 0-255, the numbers may be denoted by an 8-bit binary numeral respectively. Then the binary numerals are mapped to a corresponding PN sequence combination. For example, the bit 1 is mapped to a positive sequence of a specific PN sequence, such as PNb+, and the bit 0 is mapped to a negative sequence of a specific PN sequence, such as PNb−. The following description assumes that the frame number, the slot number, and the port number corresponding to the OLT port are 2, 3, and 4 respectively, the value range of the frame number, the slot number, and the port number is 0-15, and they are denoted by a 4-bit binary numeral respectively. In this case, FIG. 6 shows a format of the data frame generated by the signal generating module 12 and carrying the identification information that includes the OLT port information.

A second type of data frame format that carries the identification information that includes the information such as the OLT port information is described in the following:

For the content part that carries the identification information that includes the information such as the OLT port information, assuming that the identification information of the fiber to be recognized is denoted by the frame number, the slot number, and the port number corresponding to the OLT port, the numbers may be converted into binary numerals formed by a certain number of bits first. If a value range of the frame number, the slot number, and the port number is 0-7, the numbers may be denoted by a 3-bit binary numeral; and, if the value range of the frame number, the slot number, and the port number is 0-255, the numbers may be denoted by an 8-bit binary numeral. Then the converted binary numeral is encoded again. For example, n-bit m-bit (nbmb) coding is used. For example, if the numbers are denoted by a 3-bit binary numeral, 3-bit 4-bit (3b4b) coding may be used; and, if the numbers are denoted by an 8-bit binary numeral, 8-bit 10-bit (8b10b) coding may be used. The frame header part may be denoted by a sequence of binary numerals including a same number of bits and formed by all 1 s. Then the binary numerals are mapped to a corresponding PN sequence combination. For example, the bit 1 is mapped to a positive sequence of a specific PN sequence, such as PNa+, and the bit 0 is mapped to a negative sequence of a specific PN sequence, such as PNa−. Alternatively, the bit 1 is mapped to a specific PN sequence such as PNx, and the bit 0 is mapped to a negative sequence of a specific PN sequence, such as PNy.

The following description assumes that the frame number, the slot number, and the port number corresponding to the OLT port are 2, 3, and 4 respectively, the value range of the frame number, the slot number, and the port number is 0-7, and they are denoted by a 3-bit binary numeral respectively; the bit 1 is mapped to a positive sequence of a specific PN sequence, such as PNa+, and the bit 0 is mapped to a negative sequence of a specific PN sequence, such as PNa−; and a 3b4b coding scheme in the following Table 1 is used:

TABLE 1

| Frame number or slot number or port number | 3-bit binary numeral expression | Binary numeral expression after 3b4b coding |
|---|---|---|
| 0 | 000 | 0100 |
| 1 | 001 | 1001 |
| 2 | 010 | 0101 |
| 3 | 011 | 0011 |
| 4 | 100 | 0010 |
| 5 | 101 | 1010 |
| 6 | 110 | 0110 |
| 7 | 111 | 0001 |
| Frame header | / | 1111 |

Figure 7:
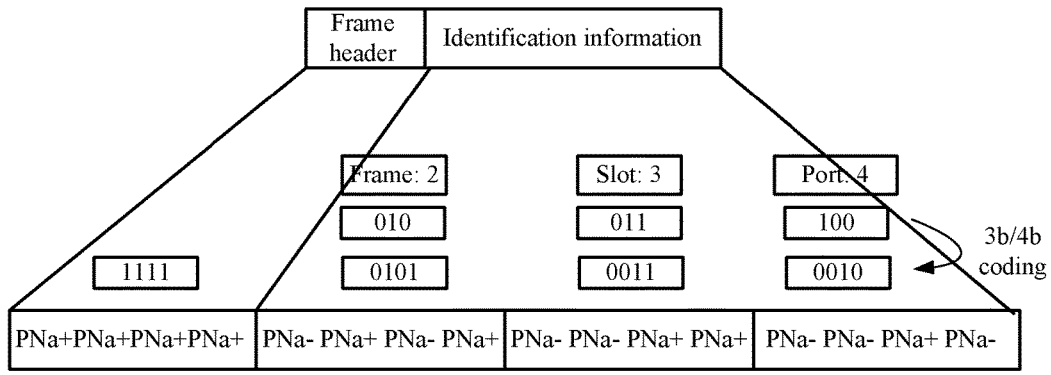
FIG. 7 is a schematic diagram of another data frame obtained from PN sequence combination coding according to an embodiment of the present invention.

In this case, FIG. 7 shows a format of the data frame generated by the signal generating module 12 and carrying the OLT port information.

Figure 8:
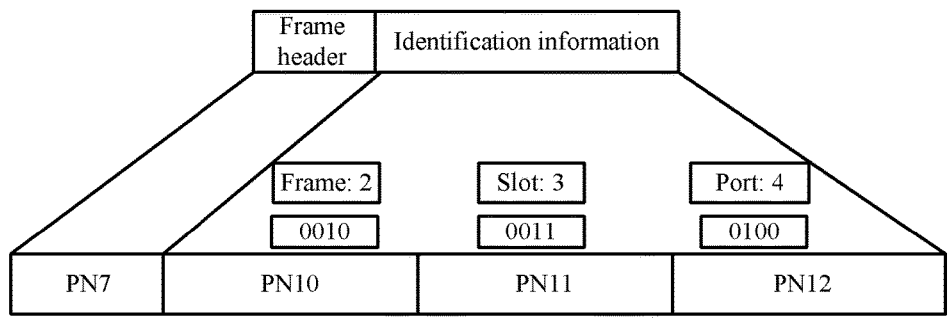
FIG. 8 is a schematic diagram of another data frame obtained from PN sequence combination coding according to an embodiment of the present invention.

A third type of data frame format that carries the identification information that includes the information such as the OLT port information is described in the following:

The frame header part may be denoted by a specific PN sequence, such as PNoffset. The frame number, the slot number, and the port number may be denoted by PN(offset+frame_id+1), PN(offset+slot_id+1), and PN(offset+port_id+1) respectively, where frame_id, slot_id, and port_id are numeric values of the frame number, the slot number, and the port number respectively, and their values generally begin with 0. The following description still assumes that the frame number, the slot number, and the port number corresponding to the OLT port are 2, 3, and 4 respectively, and offset=7. In this case, FIG. 8 shows a format of the data frame generated by the signal generating module in the OLT.

Specifically, optionally, the signal generating module 12 may further use sine signal combinations of different frequencies to denote the frame header part and the content part that carries the identification information that includes the information such as the OLT port information (the frame number, the slot number, and the port number). In this case, the data frame format that carries the identification information that includes the information such as the OLT port information is described in the following:

The frame header part may be denoted by a sine wave of a specific frequency such as fa. The frame number, the slot number, and the port number of the OLT port may be converted into binary numerals formed by a certain number of bits first. If the value range of the frame number, the slot number, and the port number is 0-15, the numbers may be denoted by a 4-bit binary numeral respectively; and, if the value range of the frame number, the slot number, and the port number is 0-255, the numbers may be denoted by an 8-bit binary numeral respectively. Then the binary numerals are mapped to a corresponding sine wave combination. For example, the bit 1 is mapped to a sine wave of a specific frequency such as fb, and the bit 0 is mapped to a sine wave of a specific frequency such as fc. To facilitate calculation, equal-length sine waves may be used to denote a frame header signal, a bit 0 signal, and a bit 1 signal respectively. Assuming that fa=2*fb=4*fc, if the frame header is denoted by four periodical sine signals of a frequency fa, it is necessary to use two periodical sine signals of a frequency fb to denote a bit 1, and use one periodical sine signal of a frequency fc to denote a bit 0.

Figure 9:
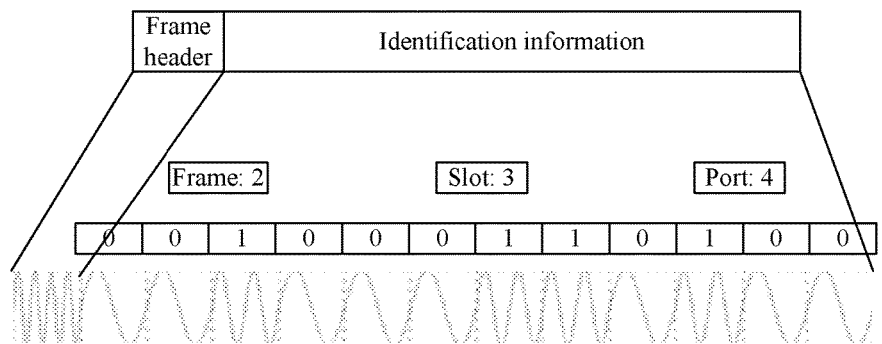
FIG. 9 is a schematic diagram of one of data frames obtained from sine signal combination coding according to an embodiment of the present invention.

Likewise, the following description assumes that the frame number, the slot number, and the port number corresponding to the OLT port are 2, 3 and 4 respectively, the value range of the frame number, the slot number, and the port number is 0-15, and they are denoted by a 4-bit binary numeral respectively. In this case, FIG. 9 shows a format of the data frame generated by the signal generating module 12.

Likewise, the data frame that carries the identification information may also use the second type of data frame format that carries the identification information that includes the information such as the OLT port information, and a sequence of binary numerals is generated according to the method, and then the binary numerals are mapped to a corresponding sine signal combination. For example, the bit 1 is mapped to a sine wave of a specific frequency such as fa, and the bit 0 is mapped to a sine wave of a specific frequency such as fb.

Figures 10, 11:
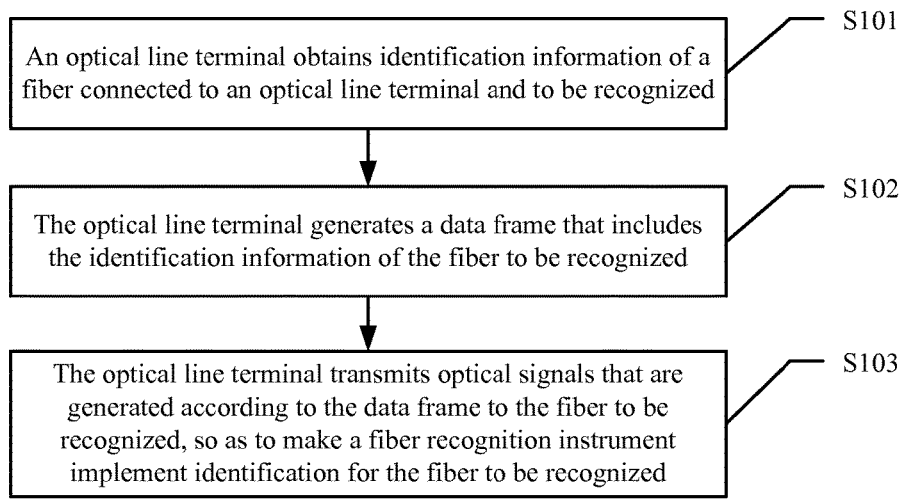
FIG. 10 is a schematic diagram of another specific data frame format according to an embodiment of the present invention.
FIG. 11 is a schematic flowchart of a first embodiment of a fiber recognition method according to the present invention.

Optionally, the data frame may further include service provider information, a protocol type, transmit optical power of the OLT port, a power budget level of the OLT port, whether the OLT port is an active port or a standby port, whether the OLT port is connected to a remote radio unit, transmit optical power of the remote radio unit if the OLT port is connected to the remote radio unit, a line coding scheme used by the OLT port, and ONU transmitting wavelength information received by the OLT. The specific format is shown in FIG. 10. The service provider information may be defined according to a digital coding scheme, or defined according to the standard ANSI T1.220. According to the definition, the service provider information may be converted into a corresponding PN sequence combination or a sine signal combination in the foregoing conversion manner of the OLT port information. The protocol type, the transmit optical power of the OLT port, the power budget level of the OLT port, whether the OLT port is an active port or a standby port, whether the OLT port is connected to a remote radio unit, the transmit optical power of the remote radio unit if the OLT port is connected to the remote radio unit, the line coding scheme used by the OLT port, and the ONU transmitting wavelength information received by the OLT may be encoded into a binary sequence, and the corresponding protocol type is converted into a corresponding PN sequence combination or a sine signal combination in the foregoing conversion manner of the OLT port information.

That the signal transmitting module 13 generates an optical signal according to the data frame generated by the signal generating module 12 may specifically include: The signal generating module 12 converts the generated data frame into a specific level signal, and outputs the level signal to the signal transmitting module 13, and the signal transmitting module 13 performs an electric-to-optical E/O conversion for the level signal generated by the signal generating module, so as to generate the optical signal.

Further, the signal transmitting module 13 may directly transmit the generated optical signal to the fiber to be recognized, or, after coupling the optical signal with an optical signal transmitted by a data transmitter of the OLT 1, transmit the coupled optical signal to the fiber to be recognized, where the data transmitter is used to transmit optical signals that include data signals. If the wavelength of the optical signal transmitted by the signal transmitting module 13 is the same as the wavelength of the optical signal transmitted by the data transmitter, a coupler may be an optical splitter. If the wavelength of the optical signal transmitted by the signal transmitting module 13 is different from the wavelength of the optical signal transmitted by the data transmitter, the coupler may be a wavelength division multiplexer. If the data frame generated by the signal generating module 12 is denoted by a sine wave, the signal transmitting module 13 may be an analog module for directly transmitting analog signals that represent the identification information that includes the information such as the port information.

Further, the signal transmitting module 13 may also serve as the data transmitter of the OLT 1. That is to say, after generating the corresponding data frame, the signal generating module 12 directly inputs the specific level signal corresponding to the data frame into the data transmitter of the OLT 1, and the data transmitter transmits the optical signal corresponding to the data frame that carries the identification information of the fiber to be recognized.

Further, the signal generating module 12 may also serve as a data media access control (MAC) module of the OLT 1, and the signal transmitting module 13 is shared as the data transmitter in the OLT 1. After obtaining the identification information of the fiber to be recognized, the obtaining module 11 inputs the information into the data MAC module of the OLT 1, and the data transmitter transmits the optical signal corresponding to the data frame that carries the identification information of the fiber to be recognized.

Further, if the obtaining module 11 is located on an OLT 1 board and the signal generating module 12 is located inside an OLT 1 optical module, the obtaining module 11 may read the identification information of the fiber to be recognized that is stored or configured on the OLT 1, and send the identification information of the fiber to be recognized to the signal generating module 12 through a control interface such as an internal integrated circuit (I2C) interface between the OLT 1 board and the OLT 1 optical module. Further, the obtaining module 11 may send coding scheme information to the signal generating module 12 through the control interface (such as the I2C interface) between the OLT 1 board and the OLT 1 optical module.

Further, if the signal generating module 12 is shared as the data MAC module of the OLT 1, the signal generating module 12 is located on the OLT 1 board, and the obtaining module 11 may read the identification information of the fiber to be recognized that is stored or configured on the OLT 1, and send the identification information of the fiber to be recognized to the signal generating module 12 over an internal bus of the OLT board. Further, the obtaining module 11 may also send the coding scheme information to the signal generating module 12 over the internal bus of the OLT 1 board.

A detection operator finds the fiber to be recognized among many fibers by using the fiber recognition instrument 2.

Figure 3:
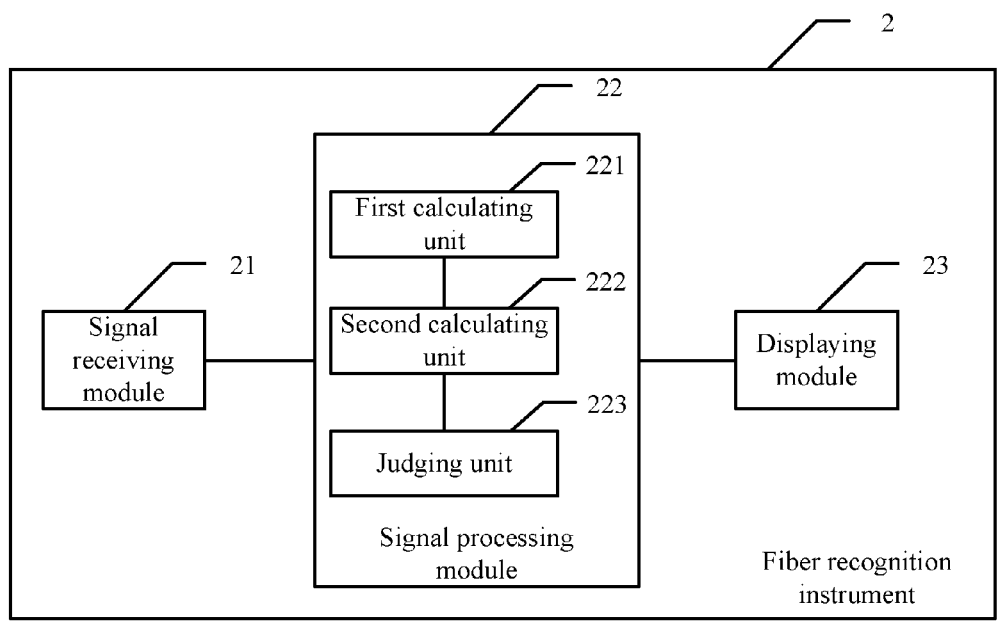
FIG. 3 is a schematic structural diagram of a fiber recognition instrument in FIG. 1.

Specifically, FIG. 3 is a schematic structural diagram of a fiber recognition instrument in FIG. 1. The fiber recognition instrument 2 may include a signal receiving module 21 and a signal processing module 22.

The signal receiving module 21 is configured to receive optical signals.

The signal processing module 22 is configured to analyze and process the optical signals received by the signal receiving module, recover information carried in the optical signals, and, according to the recovered information, implement identification for a fiber to be recognized.

The process of the fiber recognition instrument 2 receiving the optical signal through the signal receiving module 21 and the signal processing module 22 and implementing identification for the fiber to be recognized includes:

The signal receiving module 21 in the fiber recognition instrument 2 receives the optical signal, performs optical-to-electric O/E conversion for the optical signal, performs corresponding filtering and A/D conversion, generates a digital signal, and outputs the digital signal to the signal processing module 22 in the fiber recognition instrument 2. After receiving the signal output by the signal receiving module 21, the signal processing module 22 extracts information carried in the signal.

If a data frame corresponding to the optical signal in the fiber to be recognized at a central office end is obtained by converting identification information into a sequence of binary numerals and mapping the sequence to a PN sequence combination coding scheme, then for the first type of data frame format, the signal processing module 22 performs frame delimitation first for an original sequence obtained from the optical signal. For example, the signal processing module 22 may perform a correlation operation for a frame header reference sequence PNa+ with the original sequence to determine a position of the frame header PNa+, perform a cyclic shift for the original sequence, and then shift the frame header PNa+ to a start position of the sequence. For the first type of data frame format that carries the identification information that includes the information such as the OLT port information, the signal processing module 22 performs frame delimitation for the original sequence and then extracts a sequence that carries the identification information of the fiber to be recognized, performs a correlation operation for the sequence with an identification information reference sequence, that is, PNb+. According to a correlation feature of the PN sequence, PNb+ is correlated with the PNb+ sequence to obtain a positive impact signal. PNb+ is correlated with PNb− to obtain a negative impact signal. That is to say, the sequence stripped of the frame header is correlated with PNb+ to obtain a positive and negative impact string, where positive impact corresponds to PNb+, that is, a binary 1, and negative impact corresponds to PNb−, that is, a binary 0. According to a result of the correlation, a binary sequence that represents the identification information of the fiber to be recognized can be recovered, and then the fiber recognition instrument 2 can recover the identification information of the fiber to be recognized, where the identification information includes information such as the frame number, the slot number, and the port number corresponding to the OLT port information.

For the second type of data frame format that carries the identification information that includes the information such as the OLT port information, the signal processing module 22 recovers the identification information such as the corresponding OLT port information in a same manner as the manner of recovering the first type of data frame format, but a difference is: In the recovery process of the second type of data frame format, the identification information reference sequence used by the signal processing module 22 is PNa+.

For the third type of data frame format, the signal processing module 22 performs frame delimitation first for the original sequence obtained from the optical signal. For example, the signal processing module 22 may perform a correlation operation for a frame header reference sequence PNoffset with the original sequence to determine a position of the frame header PNoffset, perform a cyclic shift for the original sequence, and then shift the frame header PNoffset to the start position of the sequence. The signal processing module performs frame delimitation for the original sequence and then extracts the sequence that carries the identification information of the fiber to be recognized, performs a correlation operation for the sequence with an identification information reference sequence PNoffset+x+1. According to the correlation feature of the PN sequence, an impact signal can only be obtained by correlating PNoffset+x+1 with PNoffset+x+1, but the impact signal cannot be obtained by correlating PNoffset+x+1 with PNoffset+y+1 (x≠y). Therefore, when the impact signal is obtained by correlating the reference sequence with PNoffset+x+1, it is determined that a corresponding identification information part is x. In a step-by-step manner, all integral parts of the identification information can be recovered. Further, the fiber recognition instrument can recover the identification information of the fiber to be recognized, where the identification information includes information such as the frame number, the slot number, and the port number corresponding to the OLT port information.

If the data frame corresponding to the optical signal is obtained according to a sine signal combination coding scheme, the signal processing module 22 performs frame delimitation first. For example, the signal processing module 22 may perform a correlation operation for the frame header reference signal with the original sequence obtained from the optical signal to determine the position of the frame header, perform a cyclic shift for the original sequence, and then shift the frame header to the start position of the sequence. After performing frame delimitation for the original sequence, the signal processing module successively extracts sub-sequences of a specific length out of the sequence that carries the identification information of the fiber to be recognized, and performs spectrum analysis for the sub-sequences. If a frequency component of the sub-sequence is fb, the corresponding bit is 0; and, if the frequency component of the sub-sequence is fc, the corresponding bit is 1. Therefore, according to a result of the spectrum analysis, a binary sequence that represents the identification information of the fiber to be recognized can be recovered, and then the fiber recognition instrument 2 can recover the identification information of the fiber to be recognized, where the identification information includes information such as the frame number, the slot number, and the port number corresponding to the OLT port information.

Specifically, the signal processing module 22 in the fiber recognition instrument 2 may include:

a first calculating unit 221, configured to analyze and process an original sequence corresponding to a received optical signal, and determine a start position of the original sequence;

a second calculating unit 222, configured to recover information carried in the original sequence whose start position is determined; and a judging unit 223, configured to judge whether the recovered information is the same as the identification information of the fiber to be recognized, and, if yes, determine that a fiber that transmits the optical signal is the fiber to be recognized.

As shown in FIG. 3, the fiber recognition instrument 2 may further include a displaying module 23. The displaying module 23 is configured to display the information recovered by the signal processing module 22. That is to say, the displaying module displays the information recovered by the signal processing module 22 to a user, and the user checks whether a currently tested fiber is the fiber to be recognized, and, if yes, implements an identification operation.

Further, as required, the fiber recognition instrument 2 may further measure energy of the optical signal transmitted on the fiber to be recognized.

Further, the fiber recognition instrument 2 may also be integrated into an ONU or an ONT device. In this case, the fiber recognition instrument may use an independent data receiver or share a data receiver with the ONU.

It can be known from the embodiment described above that, the present invention has the following advantages:

The present invention can implement fiber recognition easily and conveniently with only one detection operator, which reduces labor costs. In addition, when a new ONU user is added to a distributed network, service interruption can be avoided for a user who is normally using a service. The fiber recognition system in the present invention does not need to be independent of a light source device of an OLT device, which further saves costs.

The following describes a fiber recognition method of the present invention in detail.

Refer to FIG. 11, which is a schematic flowchart of a first embodiment of a fiber recognition method according to the present invention. The method includes:

S101. An optical line terminal obtains identification information of a fiber connected to an optical line terminal and to be recognized.

The fiber to be recognized is connected to a port in the OLT, and the OLT may also transmit an optical signal that carries data according to the prior art.

The identification information obtained by the OLT in S101 includes any one of or any combination of the following: port information of the optical line terminal connected to the fiber to be recognized, service provider information, a protocol type of an optical line terminal port, transmit optical power of the optical line terminal port, a power budget level of the optical line terminal port, whether the optical line terminal port is an active port or a standby port, whether the optical line terminal port is connected to a remote radio unit, transmit optical power of the remote radio unit if the optical line terminal port is connected to the remote radio unit, a line coding scheme used by the optical line terminal port, and optical node transmitting wavelength information received by the optical line terminal.

S102. The optical line terminal generates a data frame that includes the identification information of the fiber to be recognized.

In S102, according to obtained coding scheme information, the OLT may generate the data frame that includes the identification information of the fiber to be recognized, where the coding scheme information includes any one of the following: PN sequence combination coding scheme information, Golay complementary sequence combination coding scheme information, and sine signal combination coding scheme information. The obtained coding scheme information may be preset coding scheme information obtained from a memory, or received coding scheme information that is configured by a staffer.

S103. The optical line terminal transmits optical signals that are generated according to the data frame to the fiber to be recognized, so as to make a fiber recognition instrument implement identification for the fiber to be recognized.

In S103, according to obtained transmitting indication information, the OLT may transmit the optical signals that are generated according to the data frame to the fiber to be recognized, where the transmitting indication information includes singly transmitting any one of the following: indication information, periodical burst transmitting indication information, and periodical continuous transmitting indication information. The obtained transmitting indication information may be preset transmitting indication information obtained from the memory, or received transmitting indication information that is configured by the staffer.

The coding scheme information and the transmitting indication information may be obtained in the manner of obtaining user configuration information. The OLT may include a user interface that is used to obtain coding scheme information and transmitting indication information that are configured by a user.

After S103, at a remote end, the fiber recognition instrument recognizes multiple fibers to be detected, and identifies the fiber to be recognized among them. Specifically, the fiber recognition instrument receives an optical signal on the corresponding fiber to be detected, analyzes and processes an original sequence corresponding to the received optical signal, determines a start position of the original sequence, and recovers information carried in the original sequence whose start position is determined. The fiber recognition instrument may only output and display the recovered information directly, and a detection operator determines whether a fiber to be detected that transmits the optical signal is the fiber to be recognized. The fiber recognition instrument may also automatically judge whether the recovered information is the same as the identification information of the fiber to be recognized, and, if yes, determine that the fiber to be detected that transmits the optical signal is the fiber to be recognized. The fiber recognition instrument may send prompt information such as voices and texts if the recovered information is the same as the identification information of the fiber to be recognized.

In addition, to ensure judgment accuracy, the OLT may transmit, by using a periodical burst transmitting mode or a periodical continuous transmitting mode, the optical signals that are generated according to the data frame, to the fiber to be recognized; and the fiber recognition instrument continuously receives the optical signal on the fiber to be detected, recovers multiple data frames that carry information, and performs an averaging operation for the multiple data frames to obtain the information on the fiber to be detected.

In addition, as required, the fiber recognition instrument may further measure energy of the optical signal transmitted on the fiber to be recognized.

Further, in S103, the generated optical signal may be directly transmitted to the fiber to be recognized, or, after the optical signal is coupled with an optical signal transmitted by a data transmitter of the OLT, the optical signal is transmitted to the fiber to be recognized, where the data transmitter is used to transmit optical signals that include data signals. If the wavelength of the optical signal transmitted in S103 is the same as the wavelength of the optical signal transmitted by the data transmitter, a coupler may be an optical splitter. If the wavelength of the optical signal transmitted in S103 is different from the wavelength of the optical signal transmitted by the data transmitter, the coupler may be a wavelength division multiplexer. If the data frame generated in S102 is denoted by a sine wave, an analog module may be used in S103 to directly transmit analog signals that represent the identification information that includes the information such as the port information.

Further, in S103, the data transmitter of the OLT may transmit an optical signal corresponding to the data frame that carries the identification information of the fiber to be recognized.

Further, in S102, the data frame may also be generated according to a data MAC module of the OLT; and, in S103, the data transmitter in the OLT may transmit the optical signal corresponding to the data frame that carries the identification information of the fiber to be recognized.

In the process of optical network construction, service distribution, and relevant maintenance, as controlled by an EMS or an NMS or an OLT local command control terminal, or as initiated periodically, the OLT can collect and obtain identification information of each fiber that needs to be identified and recognized, where the identification information includes the port information, and encode the identification information of each fiber to be recognized, convert the identification information into an optical signal, and transmit the optical signal to the fiber to be recognized that is connected to a corresponding OLT port. A detection operator at the remote end receives an optical signal on each fiber by using the fiber recognition instrument, extracts the identification information that includes information such as corresponding port information according to the optical signal, thereby identifying a specific fiber to be recognized, and facilitating subsequent work such as detection and evaluation of link quality and connection quality for the fiber.

In the fiber recognition process, after recognition and detection are started, it is not necessary to unplug the fiber that is already connected to the OLT 1, and only one detection operator at the remote end is required to recognize and judge, by using the fiber recognition instrument, multiple fibers to be detected, and, according to the optical signals, implement fiber identification, and can directly obtain information of an OLT port connected to the fiber. The present invention can implement fiber recognition easily and conveniently with only one detection operator, which reduces labor costs. In addition, when a new ONU user is added to a distributed network, service interruption can be avoided for a user who is normally using a service. The fiber recognition system in the present invention does not need to be independent of a light source device of an OLT device, which further saves costs.

Figure 12:
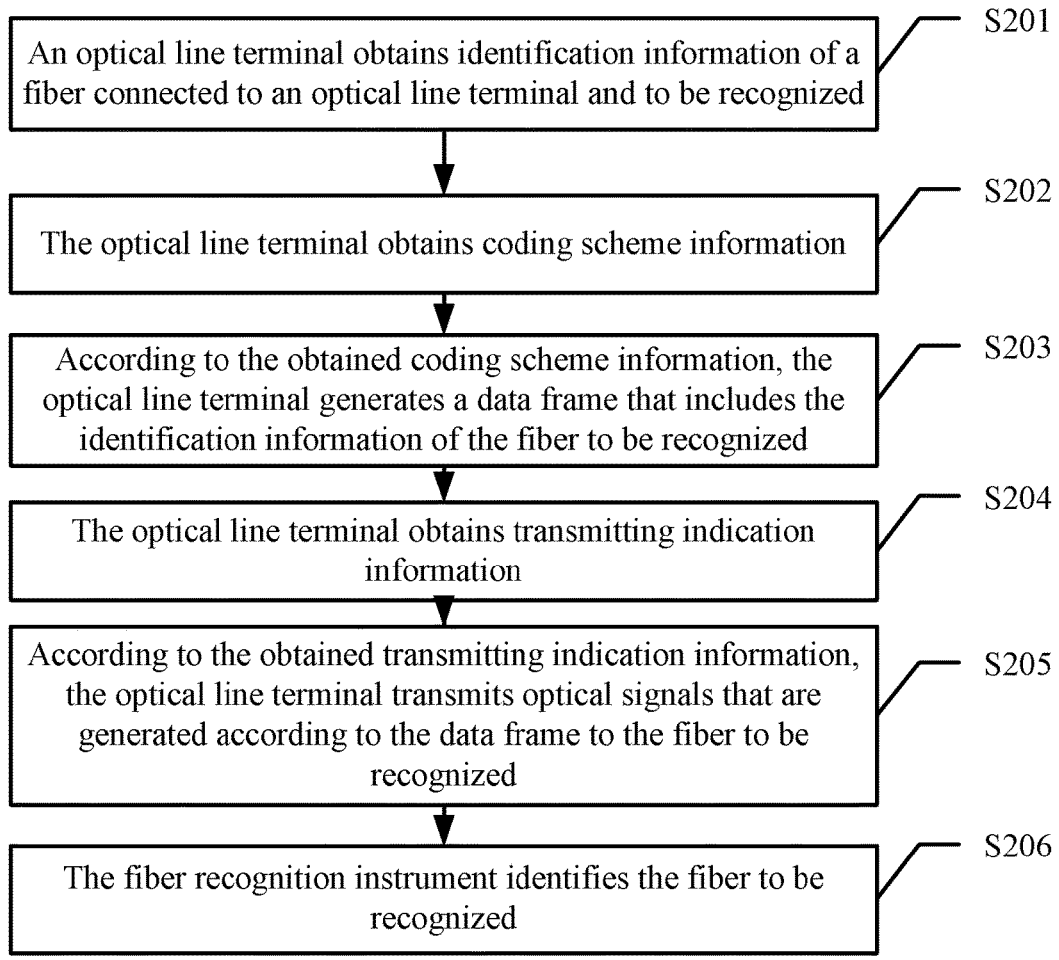
FIG. 12 is a schematic flowchart of a second embodiment of a fiber recognition method according to the present invention.

Refer to FIG. 12, which is a schematic flowchart of a second embodiment of a fiber recognition method according to the present invention. The fiber recognition method in this embodiment includes:

S201. An optical line terminal obtains identification information of a fiber connected to the optical line terminal and to be recognized, where the identification information of the fiber to be recognized includes any one of or any combination of the following: port information of the optical line terminal connected to the fiber to be recognized, service provider information, a protocol type of an optical line terminal port, transmit optical power of the optical line terminal port, a power budget level of the optical line terminal port, whether the optical line terminal port is an active port or a standby port, whether the optical line terminal port is connected to a remote radio unit, transmit optical power of the remote radio unit if the optical line terminal port is connected to the remote radio unit, a line coding scheme used by the optical line terminal port, and optical node transmitting wavelength information received by the optical line terminal. The obtained identification information may be preset identification information obtained from a memory, or received identification information that is configured by a staffer.

S202. The optical line terminal obtains coding scheme information, where the coding scheme information is used to indicate a coding scheme of a data frame that includes the identification information of the fiber to be recognized, and the coding scheme information includes any one of the following: PN sequence combination coding scheme information, Golay complementary sequence combination coding scheme information, and sine signal combination coding scheme information. The obtained coding scheme information may be preset coding scheme information obtained from the memory, or received coding scheme information that is configured by the staffer.

S203. According to the obtained coding scheme information, the optical line terminal generates the data frame that includes the identification information of the fiber to be recognized.

The structure of the data frame includes: a frame header part used to identify a start position of the data frame, and a content part that includes the identification information of the fiber to be recognized.

Specifically, optionally, to make the fiber recognition instrument increase a signal-to-noise ratio of received signals, in S203, the identification information that includes information such as OLT port information may be converted into a binary sequence, then PN sequences or sine signals are used to perform combination coding for the binary sequence, and the data frame that carries the identification information that includes the information such as the OLT port information is generated.

Specifically, the PN sequence combination coding scheme is used as an example, the data frame obtained in S203 by encoding the identification information of the fiber to be recognized may be in three formats.

A first type of data frame format that carries the identification information that includes the information such as the OLT port information is described in the following:

The frame header part may be denoted by a specific PN sequence such as PNa+. For the content part that carries the identification information that includes the information such as the OLT port information, assuming that the identification information of the fiber to be recognized is denoted by the frame number, the slot number, and the port number corresponding to the OLT PON, the numbers may be converted into binary numerals formed by a certain number of bits first. If a value range of the frame number, the slot number, and the port number is 0-15, the numbers may be denoted by a 4-bit binary numeral respectively; and, if the value range of the frame number, the slot number, and the port number is 0-255, the numbers may be denoted by an 8-bit binary numeral respectively. Then the binary numerals are mapped to a corresponding PN sequence combination. For example, the bit 1 is mapped to a positive sequence of a specific PN sequence, such as PNb+, and the bit 0 is mapped to a negative sequence of a specific PN sequence, such as PNb−. The following description assumes that the frame number, the slot number, and the port number corresponding to the OLT port are 2, 3, and 4 respectively, the value range of the frame number, the slot number, and the port number is 0-15, and they are denoted by a 4-bit binary numeral respectively. In this case, FIG. 6 shows a format of the data frame generated by the signal generating module 12 and carrying the identification information that includes information such as OLT port information.

A second type of data frame format that carries the identification information that includes the information such as the OLT port information is described in the following:

For the content part that carries the identification information that includes the information such as the OLT port information, assuming that the identification information of the fiber to be recognized is denoted by the frame number, the slot number, and the port number corresponding to the OLT port, the numbers may be converted into binary numerals formed by a certain number of bits first. If a value range of the frame number, the slot number, and the port number is 0-7, the numbers may be denoted by a 3-bit binary numeral; and, if the value range of the frame number, the slot number, and the port number is 0-255, the numbers may be denoted by an 8-bit binary numeral. Then the converted binary numeral is encoded again. For example, n-bit m-bit (nbmb) coding is used. For example, if the numbers are denoted by a 3-bit binary numeral, 3b4b coding may be used; and, if the numbers are denoted by an 8-bit binary numeral, 8b10b coding may be used. The frame header part may be denoted by a sequence of binary numerals including a same number of bits and formed by all 1 s. Then the binary numerals are mapped to a corresponding PN sequence combination. For example, the bit 1 is mapped to a positive sequence of a specific PN sequence, such as PNa+, and the bit 0 is mapped to a negative sequence of a specific PN sequence, such as PNa−. Alternatively, the bit 1 is mapped to a specific PN sequence such as PNx, and the bit 0 is mapped to a negative sequence of a specific PN sequence, such as PNy. FIG. 7 shows a format of the generated data frame that carries the identification information that includes the information such as the OLT port information.

A third type of data frame format that carries the identification information that includes the information such as the OLT port information is described in the following:

The frame header part may be denoted by a specific PN sequence, such as PNoffset. The frame number, the slot number, and the port number may be denoted by PN(offset+frame_id+1), PN(offset+slot_id+1), and PN(offset+port_id+1) respectively, where frame_id, slot_id, and port_id are numeric values of the frame number, the slot number, and the port number respectively, and their values generally begin with 0. The following description still assumes that the frame number, the slot number, and the port number corresponding to the OLT port are 2, 3, and 4 respectively, and offset=7. In this case, FIG. 8 shows a format of the data frame generated by the signal generating module in the OLT.

In addition, as regards the identification information that includes information such as the service provider information, the protocol type of the OLT port, the transmit optical power of the OLT port, the power budget level of the OLT port, whether the OLT port is an active port or a standby port, whether the OLT port is connected to a remote radio unit, the transmit optical power of the remote radio unit if the OLT port is connected to the remote radio unit, the line coding scheme used by the OLT port, and the optical node transmitting wavelength information received by the OLT, the specific data frame format is shown in FIG. 10.

The service provider information may be defined according to a digital coding scheme, or defined according to the standard ANSI T1.220. According to the definition, the service provider information may be converted into a corresponding PN sequence combination in the foregoing conversion manner of the OLT port information. The protocol type, the transmit optical power of the OLT port, the power budget level of the OLT port, whether the OLT port is an active port or a standby port, whether the OLT port is connected to a remote radio unit, the transmit optical power of the remote radio unit if the OLT port is connected to the remote radio unit, the line coding scheme used by the OLT port, and the ONU transmitting wavelength information received by the OLT may be encoded into a binary sequence, and the corresponding protocol type is converted into a corresponding PN sequence combination in the foregoing conversion manner of the OLT port information.

S204. The optical line terminal obtains transmitting indication information, where the transmitting indication information is used to indicate a transmitting mode of transmitting optical signals that are generated according to the data frame, where the transmitting indication information includes singly transmitting any one of the following: indication information, periodical burst transmitting indication information, and periodical continuous transmitting indication information. The obtained transmitting indication information may be preset transmitting indication information obtained from the memory, or the received transmitting indication information that is configured by the staffer.

In S201, S202, and S204, the identification information of the fiber to be recognized that is connected to the OLT, the coding scheme information, and the transmitting indication information may be obtained as controlled by an EMS or an NMS or an OLT local command control terminal or as initiated periodically.

S205. According to the obtained transmitting indication information, the optical line terminal transmits the optical signals that are generated according to the data frame to the fiber to be recognized.

In S205, the generated optical signal may be directly transmitted to the fiber to be recognized, or, after the optical signal is coupled with an optical signal transmitted by a data transmitter of the OLT, the optical signal is transmitted to the fiber to be recognized, where the data transmitter is used to transmit optical signals that include data signals. If the wavelength of the optical signal transmitted in S205 is the same as the wavelength of the optical signal transmitted by the data transmitter, a coupler may be an optical splitter. If the wavelength of the optical signal transmitted in S205 is different from the wavelength of the optical signal transmitted by the data transmitter, the coupler may be a wavelength division multiplexer. If the data frame generated in S203 is denoted by a sine wave, an analog module may be used in S205 to directly transmit analog signals that represent the identification information that includes the information such as the port information.

Further, in S205, the data transmitter of the OLT may transmit an optical signal corresponding to the data frame that carries the identification information of the fiber to be recognized.

Further, in S203, the data frame may also be generated according to a data MAC module of the OLT; and, in S205, the data transmitter in the OLT may transmit the optical signal corresponding to the data frame that carries the identification information of the fiber to be recognized.

S206. The fiber recognition instrument identifies the fiber to be recognized.

S206 specifically includes: The fiber recognition instrument receives an optical signal on a fiber to be detected, analyzes and processes an original sequence corresponding to the received optical signal, determines a start position of the original sequence, and recovers identification information carried in the original sequence whose start position is determined. The fiber recognition instrument may only output and display the recovered information directly, and, according to the displayed information, a detection operator determines whether the fiber that transmits the information is the fiber to be recognized. The fiber recognition instrument may also automatically judge whether the recovered information is the same as the identification information of the fiber to be recognized, and, if yes, determine that a fiber that transmits the information is the fiber to be recognized. The fiber recognition instrument may send prompt information such as voices and texts if the recovered information is the same as the identification information of the fiber to be recognized.

In S206, the signal receiving module in the fiber recognition instrument receives the optical signal, performs optical-to-electric O/E conversion for the optical signal, performs corresponding filtering and A/D conversion, generates a digital signal, and outputs the digital signal to the signal processing module in the fiber recognition instrument. After receiving the signal output by the signal receiving module, the signal processing module extracts the information.

If the data frame corresponding to the optical signal is obtained by converting the identification information into a sequence of binary numerals and mapping the sequence to a PN sequence combination coding scheme, then for the first type of data frame format that carries the identification information that includes the information such as the OLT port information, the signal processing module of the fiber recognition instrument performs frame delimitation first for an original sequence obtained from the optical signal, performs a correlation operation for a frame header reference sequence PNa+ with the original sequence to determine a position of the frame header PNa+, performs a cyclic shift for the original sequence, and then shifts the frame header PNa+ to the start position of the sequence. The signal processing module performs frame delimitation for the original sequence and then extracts a sequence that carries the identification information of the fiber to be recognized, performs a correlation operation for the sequence with an identification information reference sequence PNb+. According to a correlation feature of the PN sequence, PNb+ is correlated with PNb+ to obtain a positive impact signal. PNb+ is correlated with PNb− to obtain a negative impact signal. That is to say, the sequence stripped of the frame header is correlated with PNb+ to obtain a positive and negative impact string, where positive impact corresponds to PNb+, that is, a binary 1, and negative impact corresponds to PNb−, that is, a binary 0. According to a result of the correlation, a binary sequence that represents the identification information of the fiber to be recognized can be recovered, and then the fiber recognition instrument can recover the identification information of the fiber to be recognized, where the identification information includes information such as the frame number, the slot number, and the port number corresponding to the OLT port information.

For the second type of data frame format that carries the identification information that includes the information such as the OLT port information, the signal processing module recovers the identification information such as the corresponding OLT port information in a same manner as the manner of recovering the first type of data frame format, but a difference is: In the recovery process of the second type of data frame format, the identification information reference sequence used by the signal processing module is PNa+.

For the third type of data frame format that carries the identification information that includes the information such as the OLT port information, the signal processing module of the fiber recognition instrument performs frame delimitation first for the original sequence obtained from the optical signal, performs a correlation operation for a frame header reference sequence PNoffset with the original sequence to determine a position of the frame header PNoffset, performs a cyclic shift for the original sequence, and then shifts the frame header PNa+ to the start position of the sequence. The signal processing module performs frame delimitation for the original sequence and then extracts a sequence that carries the identification information of the fiber to be recognized, performs a correlation operation for the sequence with an identification information reference sequence PNoffset+x+1. According to the correlation feature of the PN sequence, an impact signal can only be obtained by correlating PNoffset+x+1 with PNoffset+x+1, but the impact signal cannot be obtained by correlating PNoffset+x+1 with PNoffset+y+1 (x≠y). Therefore, when the impact signal is obtained by correlating the reference sequence with PNoffset+x+1, it is determined that a corresponding identification information part is x. In a step-by-step manner, all integral parts of the identification information can be recovered. Further, the fiber recognition instrument can recover the identification information of the fiber to be recognized, where the identification information includes information such as the frame number, the slot number, and the port number corresponding to the OLT port information.

If the data frame corresponding to the optical signal is obtained according to a sine signal combination coding scheme, the signal processing module of the fiber recognition instrument performs frame delimitation first, performs a correlation operation for the frame header reference signal with the original sequence obtained from the optical signal to determine the position of the frame header, performs a cyclic shift for the original sequence, and then shifts the frame header to the start position of the sequence. After performing frame delimitation for the original sequence, the signal processing module successively extracts sub-sequences of a specific length out of the sequence that carries the identification information of the fiber to be recognized, and performs spectrum analysis for the sub-sequences. If a frequency component of the sub-sequence is fb, the corresponding bit is 0; and, if the frequency component of the sub-sequence is fc, the corresponding bit is 1. Therefore, according to a result of the spectrum analysis, a binary sequence that represents the identification information of the fiber to be recognized can be recovered, and then the fiber recognition instrument can recover the identification information of the fiber to be recognized, where the identification information includes information such as the frame number, the slot number, and the port number corresponding to the OLT port information.

In S205, the OLT may transmit, by using a periodical burst transmitting mode or a periodical continuous transmitting mode, the optical signals that are generated according to the data frame, to the fiber to be recognized; and, in S206, the fiber recognition instrument continuously receives the optical signal on the fiber to be detected, recovers multiple data frames that carry information, performs an averaging operation for the multiple data frames to obtain the information transmitted on the fiber to be detected, and then the fiber to be recognized is identified by comparing the information with the identification information of the fiber to be recognized, which makes the identification more accurate.

In addition, as required, the fiber recognition instrument may further measure energy of the optical signal transmitted on the fiber to be recognized.

It can be known from the embodiment described above that, the present invention has the following advantages:

The present invention can implement fiber recognition easily and conveniently with only one detection operator, which reduces labor costs. In addition, when a new ONU user is added to a distributed network, service interruption can be avoided for a user who is normally using a service. The fiber recognition system in the present invention does not need to be independent of a light source device of an OLT device, which further saves costs.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium maybe a magnetic disk, an optical disc, a read-only memory (ROM), or a random access memory (RAM).

The disclosures are merely exemplary embodiments of the present invention, but are not intended to limit the scope of rights of the present invention. Any equivalent change made according to the claims of the present invention shall fall within the scope of the present invention.

What is claimed is:

1. A fiber recognition method, comprising:
   obtaining identification information of a fiber connected to a port of an optical line terminal, the fiber to be recognized;
   generating a data frame that comprises the identification information of the fiber to be recognized, wherein the data frame comprises a frame header part used to identify a start position of the data frame and a content part that comprises the identification information of the fiber to be recognized; and
   transmitting optical signals that are generated according to the data frame by the fiber to be recognized, wherein the identification information of the fiber to be recognized, which is carried in the data frame, is used to instruct a fiber recognition apparatus to recognize a fiber that transmits the optical signals,
   wherein the identification information of the fiber to be recognized comprises at least one of service provider information, a protocol type of an optical line terminal port, transmit optical power of the optical line terminal port, or a power budget level of the optical line terminal port.

2. The method according to claim 1, wherein the identification information of the fiber to be recognized further comprises at least one of the following:
   port information of the optical line terminal connected to the fiber to be recognized, whether the optical line terminal port is an active port or a standby port, whether the optical line terminal port is connected to a remote radio unit, transmit optical power of the remote radio unit if the optical line terminal port is connected to the remote radio unit, a line coding scheme used by the optical line terminal port, and optical node transmitting wavelength information received by the optical line terminal.

3. The method according to claim 1, wherein the generating a data frame that comprises the identification information of the fiber to be recognized comprises:
   obtaining coding scheme information, wherein the coding scheme information is used to indicate a coding scheme of the data frame that comprises the identification information of the fiber to be recognized; and
   according to the obtained coding scheme information, generating the data frame that comprises the identification information of the fiber to be recognized, wherein
   the coding scheme information comprises any one of the following: pseudo-noise sequence combination coding scheme information, Golay complementary sequence combination coding scheme information, and sine signal combination coding scheme information.

4. The method according to claim 1, wherein the transmitting optical signals that are generated according to the data frame by the fiber to be recognized comprises:
   obtaining transmitting indication information, wherein the transmitting indication information is used to indicate a transmitting mode of transmitting the optical signals that are generated according to the data frame; and according to the obtained transmitting indication information, transmitting the optical signals that are generated according to the data frame by the fiber to be recognized, wherein the transmitting indication information comprises singly transmitting any one of the following: indication information, periodical burst transmitting indication information, and periodical continuous transmitting indication information.

5. The method according to claim 1, wherein the identifying, by the fiber recognition instrument, the fiber to be recognized comprises:

determining, by the fiber recognition instrument by analyzing and processing an original sequence corresponding to a received optical signal, a start position of the original sequence, and recovering information carried in the original sequence whose start position is determined; and judging whether the recovered information is the same as preset identification information of the fiber to be recognized, and, if yes, determining that a fiber that transmits the optical signal is the fiber to be recognized; or, displaying the recovered information directly.

6. The method according to claim 1, wherein: in an operation of transmitting optical signals that are generated according to the data frame by the fiber to be recognized, so as to make a fiber recognition instrument implement identification for the fiber to be recognized, the optical signals are transmitted, by using a periodical burst transmitting mode or a periodical continuous transmitting mode, to the fiber to be recognized, and the fiber recognition instrument receives the optical signals continuously, recovers multiple data frames, performs an averaging operation for the multiple data frames to obtain the identification information carried in the received optical signals, and compares and judges the identification information carried in the received optical signals with the preset identification information of the fiber to be recognized, so as to implement identification for the fiber to be recognized.

7. The method according to claim 1, wherein: after the fiber recognition instrument implements the identification for the fiber to be recognized, the method further comprises: measuring, by the fiber recognition instrument, energy of the optical signals transmitted on the fiber to be recognized.

8. An optical line terminal, comprising:

an obtaining module, configured to obtain identification information of a fiber connected to a port of an optical line terminal, the fiber to be recognized;

a signal generating module, configured to generate a data frame that comprises the identification information of the fiber to be recognized, wherein the data frame comprises a frame header part used to identify a start position of the data frame and a content part that comprises the identification information of the fiber to be recognized, and wherein the identification information is obtained by the obtaining module; and a signal transmitting module, configured to transmit optical signals that are generated according to the data frame by the fiber to be recognized, so as to make a fiber recognition instrument implement identification for the fiber to be recognized, wherein the data frame is generated by the signal generating module, wherein the identification information of the fiber to be recognized comprises at least one of service provider information, a protocol type of an optical line terminal port, transmit optical power of the optical line terminal port, or a power budget level of the optical line terminal port.

9. The optical line terminal according to claim 8, wherein:

the obtaining module is further configured to obtain coding scheme information, wherein the coding scheme information is used to indicate a coding scheme of the data frame that comprises the identification information of the fiber to be recognized, and the coding scheme information comprises at least one of the following:

PN sequence combination coding scheme information, Golay complementary sequence combination coding scheme information, and sine signal combination coding scheme information; and the signal generating module is configured to: according to the coding scheme information obtained by the obtaining module, generate the data frame that comprises the identification information of the fiber to be recognized.

10. The optical line terminal according to claim 9, wherein:

the obtaining module is further configured to obtain transmitting indication information, wherein the transmitting indication information is used to indicate a transmitting mode of transmitting the optical signals that are generated according to the data frame, wherein the transmitting indication information comprises singly transmitting any one of the following: indication information, periodical burst transmitting indication information, and periodical continuous transmitting indication information; and the signal transmitting module is configured to transmit the optical signals that are generated according to the data frame by the fiber to be recognized according to the transmitting mode indicated in the indication information obtained by the obtaining module.

11. The optical line terminal according to claim 8, wherein the optical line terminal comprises a user interface that is used to obtain coding scheme information and transmitting indication information that are set by a user.

12. A fiber recognition system, comprising an optical line terminal and a fiber recognition instrument, wherein a fiber to be recognized is connected to the optical line terminal, and wherein:

the optical line terminal is configured to obtain identification information of the fiber to be recognized, and generate a data frame that comprises the obtained identification information of the fiber to be recognized, and transmit optical signals that are generated according to the data frame by the fiber to be recognized, wherein the data frame comprises a frame header part used to identify a start position of the data frame and a content part that comprises the identification information of the fiber to be recognized; and the fiber recognition instrument is configured to implement identification for the fiber to be recognized according to the received optical signals, wherein the identification information of the fiber to be recognized comprises at least one of service provider information, a protocol type of an optical line terminal port, transmit optical power of the optical line terminal port, or a power budget level of the optical line terminal port.

13. The system according to claim 12, wherein:

the optical line terminal transmits, by using a periodical burst transmitting mode or a periodical continuous transmitting mode, the optical signals that are generated according to the data frame, to the fiber to be recognized; and the fiber recognition instrument receives the optical signals continuously, recovers multiple data frames, performs an averaging operation for the multiple data frames to obtain the identification information carried in the received optical signals, and compares and judges the identification information carried in the received optical signals with preset identification information of the fiber to be recognized, so as to implement identification for the fiber to be recognized.

14. A fiber recognition system, comprising:

an optical line terminal coupled to a fiber, and configured to obtain identification information of the fiber, to generate a data frame comprising the obtained identification information, and to transmit optical signals generated according to the data frame to the fiber, wherein the data frame comprises a frame header part used to identify a start position of the data frame and a content part that comprises the identification information of the fiber to be recognized; and a fiber recognition instrument configured to identify the fiber according to received optical signals, wherein the identification information of the fiber comprises at least one of service provider information, a protocol type of an optical line terminal port, transmit optical power of the optical line terminal port, or a power budget level of the optical line terminal port.

* * * * *